US009688566B2

(12) United States Patent
Darbouret et al.

(10) Patent No.: US 9,688,566 B2
(45) Date of Patent: Jun. 27, 2017

(54) NICKEL-FREE AND CHROMIUM-FREE FOREHEARTH COLORS FOR GLASS TANKS

(71) Applicant: Ferro Corporation, Mayfield Heights, OH (US)

(72) Inventors: Benoit Darbouret, Saint-Dizier (FR); Jean-Luc Grapton, Gigny Bussy (FR); George E. Sakoske, Independence, OH (US)

(73) Assignee: Ferro Corporation, Mayfield Heights, OH (US)

(*) Notice: Subject to any disclaimer, the term of this patent is extended or adjusted under 35 U.S.C. 154(b) by 0 days.

(21) Appl. No.: 15/227,136

(22) Filed: Aug. 3, 2016

(65) Prior Publication Data

US 2017/0036947 A1 Feb. 9, 2017

Related U.S. Application Data

(60) Provisional application No. 62/202,367, filed on Aug. 7, 2015.

(51) Int. Cl.
| | |
|---|---|
| *C03C 8/04* | (2006.01) |
| *C03C 4/02* | (2006.01) |
| *C03B 1/00* | (2006.01) |
| *C03C 3/089* | (2006.01) |
| *C03C 3/093* | (2006.01) |
| *C03C 8/22* | (2006.01) |

(52) U.S. Cl.
CPC ............... *C03C 8/04* (2013.01); *C03B 1/00* (2013.01); *C03C 3/089* (2013.01); *C03C 3/093* (2013.01); *C03C 4/02* (2013.01); *C03C 8/22* (2013.01); *C03C 2204/00* (2013.01)

(58) Field of Classification Search
CPC ............... C03C 8/04; C03C 4/02; C03B 1/00
See application file for complete search history.

(56) References Cited

U.S. PATENT DOCUMENTS

| | | |
|---|---|---|
| 3,024,120 A | 3/1962 | Babcock |
| 3,024,121 A | 3/1962 | Hagedorn |
| 3,326,702 A | 6/1967 | Babcock |
| 3,364,041 A | 1/1968 | Swain, Jr. et al. |
| 3,481,750 A | 12/1969 | Swain |
| 3,513,003 A | 5/1970 | Hammer |
| 3,663,245 A | 5/1972 | Bryson |

(Continued)

FOREIGN PATENT DOCUMENTS

WO    2005/000753 A2    1/2005

OTHER PUBLICATIONS

European Search Report for corresponding EP16182518 mailed Jan. 4, 2017, two pages.

*Primary Examiner* — Karl Group
(74) *Attorney, Agent, or Firm* — Rankin, Hill & Clark LLP

(57) ABSTRACT

The invention relates to the field of forehearth frits, pearls, and/or concentrates for use in glass compositions. In particular, the present invention provides a system of forehearth frits, pearls, and/or concentrates that is capable of imparting a brown color to a glass composition for forming colored glass in the forehearth of a glass furnace, and a method of using the colored system of forehearth frits, pearls, and/or concentrates. The invention further provides a glass composition for use in forming the color system or for use directly in a forehearth.

15 Claims, 1 Drawing Sheet

(56) References Cited

U.S. PATENT DOCUMENTS

| | | | |
|---|---|---|---|
| 3,928,050 A | 12/1975 | Jasinski | |
| 5,256,602 A | 10/1993 | Danielson et al. | |
| 5,393,714 A | 2/1995 | Thometzek et al. | |
| 5,491,115 A | 2/1996 | Pfitzenmaier et al. | |
| 6,984,597 B2 | 1/2006 | Ackerman | |
| 7,265,069 B2 | 9/2007 | Sakoske et al. | |
| 7,737,062 B2 | 6/2010 | Sakoske et al. | |
| 8,932,967 B2 | 1/2015 | Bettoli | |
| 8,946,102 B2 | 2/2015 | Axtell, III et al. | |
| 9,296,641 B2 * | 3/2016 | Smith | C03C 3/087 |
| 9,334,189 B2 | 5/2016 | Axtell, III et al. | |
| 2008/0103039 A1 | 5/2008 | Jones | |
| 2012/0196126 A1 * | 8/2012 | Axtell, III | C03C 3/091 428/402 |

* cited by examiner

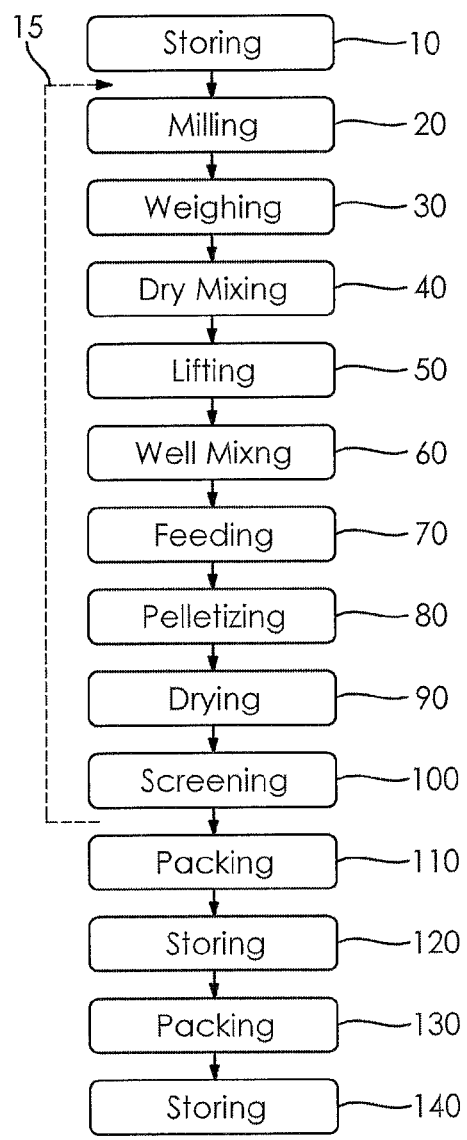

US 9,688,566 B2

NICKEL-FREE AND CHROMIUM-FREE FOREHEARTH COLORS FOR GLASS TANKS

BACKGROUND OF THE INVENTION

1. Field of Invention

The present invention relates to the field of forehearth frits, pearls, and/or concentrates for use in glass compositions. In particular, the present invention provides a system of forehearth frits, pearls, and/or concentrates that is capable of imparting a brown color to a glass composition for forming colored glass in the forehearth of a glass furnace, and a method of using the colored system of forehearth frits, pearls, and/or concentrates. The invention further provides a glass composition for use in forming the color system or for use directly in a forehearth.

2. Description of Related Art

Prior art methods of imparting brown colors to glass typically include high concentrations of nickel and other heavy metals such as chromium. Such metals are viewed as environmentally unfriendly by various governments.

BRIEF SUMMARY OF THE INVENTION

Accordingly, efforts to eliminate heavy metals in glass coloring systems are sought. The present invention is one such effort.

The manufacture of colored glass in a forehearth of a furnace may be undertaken by the addition of either: (i) a color enriched glass frit, or (ii) a forehearth color concentrate or pearl comprising a non-smelted compacted interspersion, to a molten clear or colorless base glass. In such processes, the color enriched glass frit or color forehearth concentrate or pearl is added to the molten glass flowing through the forehearth of a furnace. This process makes possible the manufacture of both one or more color glass items and clear/colorless glass items from a single melting furnace equipped with multiple forehearths. In the forehearth coloration process, the glass frit or color forehearth concentrate or pearl is metered into the molten base glass after the base glass flows from the refining zone or distributor of the furnace and into the forehearth.

The present invention provides a system of color forehearth frits, pearls and/or concentrates that can be quickly and completely dispersed and dissolved when added to the molten base glass of a forehearth furnace at conventional commercial molten glass temperatures. Accordingly, the system of frits, pearls and/or concentrates can be used at a lower loading (less than about 10 wt %, preferably less than 5 wt %, possibly as low as 3-4 wt %) in the final glass composition relative to the prior art. Use of the forehearth color frits, pearls and/or concentrates of the present invention leads to a uniform dispersion of colored glass with the base glass becoming colored. The invention further provides methods of using the glass frits, concentrates or pearls, and a method for forming an agglomerated color concentrate or pearl.

Broadly, the forehearth color system comprises one or several nickel and chromium-free color glass frits and/or one or several pearls or concentrates.

An embodiment of the invention is a color glass frit free of nickel and chromium, the frit comprising in weight % A: (Frit A)
a. from about 30 to about 50% $SiO_2$,
b. from about 15 to about 30% $Na_2O$,
c. from about 1 to about 10% $B_2O_3$,
d. from about 10 to about 30% $Fe_2O_3$,
e. from about 0.1 to about 5% ZnO,
f. from about 0.1 to about 5% $Al_2O_3$.
g. from about 0.1 to about 5% CuO,
h. from about 0.01 to about 1% CoO,
i. from about 0.1 to about 5% Se,
j. from about 1 to about 8% $SnO/SnO_2$,
k. no nickel and
l. no chromium.

A method for coloring a molten base glass in the forehearth of a glass furnace in accordance with the present invention comprises the steps of:
a. forming a frit (Frit A) that is free of nickel and chromium, the frit comprising:
  i. from about 30 to about 50% $SiO_2$,
  ii. from about 15 to about 30% $Na_2O$,
  iii. from about 1 to about 10% $B_2O_3$,
  iv. from about 10 to about 30% $Fe_2O_3$,
  v. from about 0.1 to about 5% ZnO,
  vi. from about 0.1 to about 5% $Al_2O_3$.
  vii. from about 0.1 to about 5% CuO,
  viii. from about 0.01 to about 1% CoO,
  ix. from about 0.1 to about 5% Se; and
  x. from about 1 to about 8% $SnO/SnO_2$.
b. combining the frit with the molten glass contained in a forehearth so as to impart color to the molten glass; and
c. cooling the molten glass to form a color glass composition.

An embodiment of the invention is a system of at least two color glass frits free of nickel and chromium, the first frit comprising in weight %:
a. from about 30 to about 50% $SiO_2$, (Frit B)
b. from about 15 to about 30% $Na_2O$,
c. from about 1 to about 10% $B_2O_3$, and
d. from about 10 to about 30% $Fe_2O_3$,
e. from about 0.1 to about 5% ZnO,
f. from about 0.1 to about 10% $Al_2O_3$,
g. from about 0.1 to about 5% CuO,
h. from about 0.01 to about 1% CoO, and
i. from about 0.1 to about 5% Se.

In this embodiment, the second frit free of nickel and chromium comprises in weight %: (Frit C)
a. from about 30 to about 65% $SiO_2$,
b. from about 5 to about 15% $Na_2O$,
c. from about 1 to about 5% $B_2O_3$,
d. from about 1 to about 5% ZnO,
e. from about 5 to about 17% SnO/SnO2,
f. from about 0.1 to about 3% $Al_2O_3$,
g. from about 3 to about 10% $K_2O$,
h. from about 3 to about 10% BaO,
i. from about 2 to about 6% CaO.

A method for coloring a molten base glass in the forehearth of a glass furnace in accordance with the present invention comprises the steps of:
a. forming a first frit that is free of nickel and chromium, the first frit comprising in weight %:
  i. from about 30 to about 50% $SiO_2$, (Frit B)
  ii. from about 15 to about 30% $Na_2O$,
  iii. from about 1 to about 10% $B_2O_3$,
  iv. from about 10 to about 30% $Fe_2O_3$,
  v. from about 0.1 to about 5% ZnO,
  vi. from about 0.1 to about 10% $Al_2O_3$.
  vii. from about 0.1 to about 5% CuO,
  viii. from about 0.01 to about 1% CoO, and
  ix. from about 0.1 to about 5% Se and
b. forming a second frit (Frit C) that is free of nickel and chromium, the second frit comprising in weight % i. from about 30 to about 65% $SiO_2$, (Frit C)
ii. from about 5 to about 15% $Na_2O$,
iii. from about 1 to about 5% $B_2O_3$,
iv. from about 1 to about 5% ZnO,
v. from about 5 to about 17% $SnO/SnO_2$,
vi. from about 0.1 to about 3% $Al_2O_3$,
vii. from about 3 to about 10% $K_2O$,
viii. from about 3 to about 10% BaO, and
ix. from about 2 to about 6% CaO,
c. combining the first and second frits with the molten glass contained in a forehearth so as to impart color to the molten glass; and
d. cooling the molten glass to form a color glass composition.

An embodiment of the invention is a color system including at least one frit that is free of nickel and chromium and at least one pearl or concentrate that is free of nickel and chromium. The frit (Frit B) comprises in weight %:
a. from about 30 to about 50% $SiO_2$,
b. from about 15 to about 30% $Na_2O$,
c. from about 1to about 10% $B_2O_3$,
d. from about 10 to about 30% $Fe_2O_3$,
e. from about 0.1 to about 5% ZnO,
f. from about 0.1 to about 10% $Al_2O_3$.
g. from about 0.1 to about 5% CuO,
h. from about 0.01 to about 1% CoO,
i. from about 0.1 to about 5% Se.

The pearl (or concentrate) comprises a glass frit comprising in weight %:
a. from about 15 to about 45% $SiO_2$,
b. from about 20 to about 50% $Na_2O$,
c. from about 0.5 to about 5% $B_2O_3$,
d. from about 15 to about 35% $SnO/SnO_2$, and
e. from about 0.1 to about 3% CaO.

The pearl contains in addition to the 1-30% of the glass frit, 5-70% of a binder and 1-70% of raw materials. In an alternate version of this embodiment, any frit, herein, for example Frit A, Frit B or Frit C or the pearl additionally may be devoid of at least one of $SnO/SnO_2$, $K_2O$, BaO, CaO and MgO. Versions of this and other embodiments are also envisioned that are devoid of all of the aforementioned ingredients. In this alternate version, the pearl additionally may be devoid of at least one of $Fe_2O_3$, ZnO, $Al_2O_3$, CoO, Se, $K_2O$, BaO and MgO. Versions of this and other embodiments are also envisioned that are devoid of all of the aforementioned ingredients.

A method for coloring a molten base glass in the forehearth of a glass furnace in accordance with the present invention comprises the steps of:
a. forming a first frit (Frit B) that is free of nickel and chromium, the first frit comprising in weight %:
i. from about 30 to about 50% $SiO_2$,
ii. from about 15 to about 30% $Na_2O$,
iii. from about 1to about 10% $B_2O_3$,
iv. from about 10 to about 30% $Fe_2O_3$,
v. from about 0.1 to about 5% ZnO,
vi. from about 0.1 to about 10% $Al_2O_3$.
vii. from about 0.1 to about 5% CuO,
viii. from about 0.01 to about 1% CoO, and
ix. from about 0.1 to about 5% Se and
b. forming a pearl that is free of nickel and chromium and comprises
i. from about 15 to about 45% $SiO_2$, (pearl)
ii. from about 20 to about 50% $Na_2O$,
iii. from about 0.5 to about 5% $B_2O_3$,
iv. from about 15 to about 35% $SnO/Sn_2$, and
v. from about 0.1 to about 3% CaO.
c. combining the first frit and pearl with the molten glass contained in a forehearth so as to impart color to the molten glass; and
d. cooling the molten glass to form a color glass composition.

A method for coloring a molten base glass in the forehearth of a glass furnace in accordance with the present invention comprises the steps of:
a. forming at least one of nickel- and chromium-free frits, pearls and concentrates,
b. combining the at least one of nickel- and chromium-free frits, pearls and concentrates with the molten glass contained in a forehearth so as to impart color to the molten glass; and
c. cooling the molten glass to form a color glass composition.

In the method, the frits, pearls and concentrates may be any disclosed elsewhere herein, for example those in Table 1.

In another embodiment the invention provides a method of forming an agglomerated color forehearth concentrate or pearl for use in coloring glass comprising a non-smelted interspersion of particles formed by the steps of: (i) providing raw materials, (ii) providing a binder, (iii) optionally providing a base milled nickel and chromium free frit, (iv) optionally adding solvent or water, (v) thoroughly mixing the composition to form a mixture and (vi) agglomerating the mixture by pelletizing or compacting the mixture to form a color forehearth pearl or concentrate. (vii) optional drying under 400° C. The optional base milled nickel and chromium free frit can be any frit or combination of frits.

The present invention provides a color forehearth system to provide color to mass produced glasses. The frits, pearls and concentrates of the invention may be used separately or together at a total concentration of less than 10% by weight relative to the weight of base glass so colored, and will not require extended time reduced temperature striking of the base glass to produce the color.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

BRIEF DESCRIPTION OF THE DRAWINGS

FIG. 1 is a schematic depiction of the physical processing of an embodiment of the invention.

DETAILED DESCRIPTION OF THE INVENTION

In the manufacturing of color glasses it is well known that the color pigments can be added to a forehearth, which is situated between a furnace and an automatic forming machine. The object of the present invention is to add forehearth frits, pearls or concentrates to impart color to glasses to produce a brown color where the forehearth frits, pearls or concentrates are devoid of nickel, and chromium and preferably, devoid of certain other heavy metals. Additives such as alumina, sulfur, titanium oxide, zinc oxide, boron oxide, zirconium oxide, sodium oxide, calcium oxide, and magnesium oxide may be included.

All compositional percentages herein are by weight and are given for a blend prior smelting for frits and prior to drying for pearls or concentrates. All percentages, temperatures, times, particle sizes and ranges of other values are presumed to be accompanied by the modifier "about" Details on each component and ingredient follow.

Color Glass Frits. The color frits of the invention provide black and/or, brown colors while avoiding the presence of certain heavy metals such as at least nickel, chromium, and vanadium. Oxides of metals such as Fe, Se, Co, Cu, Mn, Sn and Ti may be present.

TABLE 1

First, Second and Third Color Systems. Constituent Ranges in wt % prior to smelting or drying.

| Component | First Color System (One Frit) Frit A | Second Color System of Two Frits Frit B | Third color system (one frit + one pearl) | | |
|---|---|---|---|---|---|
| | | | Frit C | Frit B | Pearl |
| $SiO_2$ | 30-50 | 30-50 | 30-65 | 30-50 | 15-45 |
| $Na_2O$ | 15-30 | 15-30 | 5-15 | 15-30 | 20-50 |
| $B_2O_3$ | 1-10 | 1-10 | 1-5 | 1-10 | 0.5-5 |
| $Fe_2O_3$ | 10-30 | 10-30 | 0 | 10-30 | 0 |
| ZnO | 0.1-5 | 0.1-5 | 1-5 | 0.1-5 | 0 |
| $Al_2O_3$ | 0.1-5 | 0.1-10 | 0.1-3 | 0.1-10 | 0 |
| CuO | 0.1-5 | 0.1-5 | 0 | 0.1-5 | 0 |
| CoO | 0.01-1 | 0.01-1 | 0 | 0.01-1 | 0 |
| Se | 0.1-5 | 0.1-5 | 0 | 0.1-5 | 0 |
| $SnO/SnO_2$ | 1-8 | 0 | 5-17 | 0 | 15-35 |
| $K_2O$ | 0 | 0 | 3-10 | 0 | 0 |
| BaO | 0 | 0 | 3-10 | 0 | 0 |
| CaO | 0 | 0 | 2-6 | 0 | 0.1-3 |
| MgO | 0 | 0 | 0-0.1 | 0 | 0 |
| Ni (any form) | 0 | 0 | 0 | 0 | 0 |
| Cr (any form) | 0 | 0 | 0 | 0 | 0 |

The glass frits and pearls in the above table are the broadest compositions for the first, second and third color systems. In any embodiment of any composition or method herein where alumina ($Al_2O_3$) is present in an amount of at least 0, 0.1 or 1 wt %, an alternate embodiment is where the alumina is present in an amount of at least 0.5 wt %.

In any embodiment herein, the forehearth color frits, pearls or concentrates may contain at least one of less than 5% nickel, less than 5% chrome, less than 5% cobalt, less than 5% vanadium, and less than 25% manganese. In more preferred embodiment, the forehearth color frits, pearls or concentrates may contain one or more of the components listed in this paragraph under the limits recited, to include zero.

In a preferred embodiment, the Frit A includes less than 6 wt % of $B_2O_3$, preferably 0.05 to less than 6%. In a preferred embodiment, Frit A contains cobalt (as Co3O4) in an amount of less than 2%, preferably 0.01 to less than 2%. In a preferred embodiment, $SiO_2$ is present in an amount higher than 30% in Frit A.

In alternate embodiments of any frit, concentrate, pearl or system of the invention, the frits, pearls, concentrates or systems are free of at least one selected from the group consisting of heavy metals, in particular, lead, cadmium, chromium, and vanadium.

The first and second color glass frits may be present in a weight ratio of 100:1 to 1:100. In a preferred embodiment, the second color frit may contain $SiO_2$ in an amount of about 55 to about 65 wt %.

Method. A method for coloring a molten base glass in the forehearth of a glass furnace in accordance with the present invention comprises the steps of:
 a. forming a frit (Frit A) that is free of nickel and chromium, the frit comprising
   i. from about 30 to about 50% $SiO_2$,
   ii. from about 15 to about 30% $Na_2O$,
   iii. from about Ito about 10% $B_2O_3$,
   iv. from about 10 to about 30% $Fe_2O_3$,
   v. from about 0.1 to about 5% ZnO,
   vi. from about 0.1 to about 5% $Al_2O_3$.
   vii. from about 0.1 to about 5% CuO,
   viii. from about 0.01 to about 1% CoO,
   ix. from about 0.1 to about 5% Se; and
   x. from about 1 to about 8% $SnO/SnO_2$.
 b. combining the frit with the molten glass contained in a forehearth so as to impart color to the molten glass; and
 c. cooling the molten glass to form a color glass composition.

A method for coloring a molten base glass in the forehearth of a glass furnace in accordance with the present invention comprises the steps of:
 a. forming a first frit (Frit B) that is free of nickel and chromium, the first frit comprising in weight %:
   i. from about 30 to about 50% $SiO_2$,
   ii. from about 15 to about 30% $Na_2O$,
   iii. from about Ito about 10% $B_2O_3$,
   iv. from about 10 to about 30% $Fe_2O_3$,
   v. from about 0.1 to about 5% ZnO,
   vi. from about 0.1 to about 10% $Al_2O_3$.
   vii. from about 0.1 to about 5% CuO,
   viii. from about 0.01 to about 1% CoO, and
   ix. from about 0.1 to about 5% Se and
 b. forming a second frit that is free of nickel and chromium, the second frit comprising in weight %
   i. from about 30 to about 65% $SiO_2$, (Frit C)
   ii. from about 5 to about 15% $Na_2O$,
   iii. from about 1 to about 5% $B_2O_3$,
   iv. from about 1 to about 5% ZnO,
   v. from about 5 to about 17% SnO or $SnO_2$,
   vi. from about 0.1 to about 3% $Al_2O_3$,
   vii. from about 3 to about 10% $K_2O$,
   viii. from about 3 to about 10% BaO, and
   ix. from about 2 to about 6% CaO,
 c. combining the first and second frits with the molten glass contained in a forehearth so as to impart color to the molten glass; and
 d. cooling the molten glass to form a color glass composition.

A method for coloring a molten base glass in the forehearth of a glass furnace in accordance with the present invention comprises the steps of:
 a. forming a first frit that is free of nickel and chromium, the first frit comprising in weight %
   i. from about 30 to about 50% $SiO_2$, (Frit B)
   ii. from about 15 to about 30% $Na_2O$,
   iii. from about 1 to about 10% $B_2O_3$, and
   iv. from about 10 to about 30% $Fe_2O_3$,
   v. from about 0.1 to about 5% ZnO,
   vi. from about 0.1 to about 10% $Al_2O_3$.
   vii. from about 0.1 to about 5% CuO,
   viii. from about 0.01 to about 1% CoO, and
   ix. from about 0.1 to about 5% Se and
 b. forming a pearl that is free of nickel and chromium and comprises
   i. from about 15 to about 45% $SiO_2$, (pearl)
   ii. from about 20 to about 50% Na2O,
   iii. from about 0.5 to about 5% $B_2O_3$,
   iv. from about 15 to about 35% $SnO/SnO_2$, and
   v. from about 0.1 to about 3% CaO.

c. combining the first frit and pearl with the molten glass contained in a forehearth so as to impart color to the molten glass; and d. cooling the molten glass to form a color glass composition.

In any embodiment herein, the forehearth color concentrate of the method may contain at least one of less than 5% nickel, less than 5% chrome, less than 5% cobalt, less than 5% vanadium, and less than 25% manganese. In more preferred embodiment, the forehearth color concentrate of the method may contain one or more of the components listed in this paragraph under the limits recited, to include zero.

In a preferred embodiment of the method, frits contain less than 6 wt % of $B_2O_3$. In a preferred embodiment of the method, frits contain cobalt (as $Co_3O_4$) in an amount less than 2%, preferably 0.01 to less than 2%. In a preferred embodiment of the method, frits contain $SiO_2$ higher than 30%. In a preferred embodiment of the method, the forehearth color frits, pearls and concentrates are free of heavy metals.

The frit or frits comprising the glass component can be formed by conventional methods. Preferably, selected oxides are smelted in a continuous, rotary or induction smelter and then the molten glass is converted to frit using water-cooled rollers or water quenching.

Binder. The binder used in the color forehearth pearls or concentrates according to the present invention can be any substance that is compatible with the base glass being colored and does not interfere with dispersion of the glass component. The binder is used at a rate of 5-70 wt % of the color systems disclosed herein, preferably 10-65 wt %. The binder helps hold the non-smelted agglomerated interspersion raw materials together until they are added to the base glass in the forehearth. Once the color forehearth pearls, pellets or concentrates have been added to the base glass being colored, the binder locally and temporarily reduces the fusion temperature between the glass component and the base glass for a time sufficient to permit a rapid and thorough dispersion of the color glass frit(s) through the base glass. The binder also disperses throughout the base glass and becomes diluted to the point that it does not alter the basic characteristics of the base glass.

Suitable binders for use in the invention comprise one or more materials selected from the group consisting of alkali borates, boric acid, alkali phosphates, orthophosphoric acid, alkali silicates, fluorosilicic acid, alkali fluorides, alkali salts, alkali hydroxides and mixtures. Suitable alkali cations include the alkali metals such as sodium, potassium and lithium and the alkaline earth metals such as calcium, magnesium and barium.

Suitable alkali borates that can be employed as binders in the invention include borax, potassium pentaborate, potassium metaborate, potassium tetraborate, and calcium borate. Among the alkali phosphates which can be employed are hemisodium phosphate, monosodium phosphate, disodium phosphate, trisodium phosphate, monopotassium phosphate, dipotassium phosphate, tripotassium phosphate, monoammonium phosphate, diammonium phosphate, monocalcium phosphate, dicalcium phosphate, tricalcium phosphate, sodium acid pyrophosphate, tetrasodium pyrophosphate, tetrapotassium pyrophosphate, calcium pyrophosphate, sodium tripolyphosphate, potassium tripolyphosphate, calcium tripolyphosphate, potassium metaphosphate, sodium trimetaphosphate, sodium monofluorophosphate, calcium monofluorophosphate and sodium tetrametaphosphate. Suitable alkali silicates include sodium silicate, potassium silicate, sodium fluorosilicate and calcium fluorosilicate. Suitable alkali fluorides include sodium aluminum fluoride, calcium fluoride, lithium fluoride, anhydrous potassium fluoride, potassium fluoride dihydrate, potassium bifluoride and sodium fluoride. Suitable alkali salts include sodium carbonate and barium carbonate. Suitable alkali hydroxides include sodium hydroxide, lithium hydroxide and potassium hydroxide.

The preferred binders however are the alkali silicates formed from alkali metals such as potassium, lithium and sodium. The alkali metal silicates are preferred because they are readily dispersed when added to base glasses in the forehearth. Of the alkali silicates, the silicate of sodium is most preferred.

Pearls or Concentrates. Color forehearth pearls or concentrates according to the invention comprise a non-smelted agglomerated interspersion of particles. In other words, the binder and other components are not fused or smelted together, but rather they are formed into an agglomerated interspersion of particles by physical compression or granulation (pelletization). The non-smelted agglomerated interspersion of particles, which are sometimes referred to as pearls or concentrates, are non-dusting and easy to handle and meter into the base glass in the forehearth. The pearls or concentrate can be formed into any size, but are preferably small to reduce the amount of time necessary for them to disperse into the molten base glass. Pearls and concentrates generally having a size of about 1 mm to about 10 mm are preferred. Concentrates can be formed using conventional cold compaction equipment and methods. Pearls can be formed using conventional granulation (pelletization) equipment and processes.

The present invention also provides a method for coloring a molten base glass in a forehearth furnace. The method comprises the steps of: (i) providing at least one of color frits, pearls and concentrates according to the invention; (ii) adding at least one of the color frits, pearls and concentrates to a molten base glass in a forehearth so as to impart color to the molten base glass; and (iii) cooling the molten base glass to form a color glass composition. The color forehearth pearls or concentrates according to the invention are added as a particulate solid at a point in the forehearth other than in the base glass main melting tank. Ordinarily, the addition will most conveniently be made, on a continuous basis, to the pool of molten glass in the forehearth shortly after it issues from the main melting tank.

Where advantageous however, the method of this invention may be practiced as a batch process, with the color forehearth frits, pearls or concentrates being added to a melted base glass batch, or being added as a glass forming-coloring ingredient to the normal glass forming batch composition prior to melting.

Distribution and dispersion of the color forehearth frits, pearls or concentrates according to the invention in the molten base glass may be accomplished by any suitable means, such as by introducing a stirring device into the pool of glass or by adding the color forehearth frits, pearls or concentrates while the base glass is being drawn and moved through a confined area such that flaw and slip within the glass produces a homogeneous mixture. The locus and manner of mixing will readily be selected by those skilled in the art and the particular method of addition will depend on the apparatus available.

The amount of color frits, pearls or concentrates to be added to the base glass will be determined by numerous parameters such as the quantum of molten base glass, its flow rate through the forehearth, the concentration of coloring agents in the frits, pearls or concentrates, and the degree of coloring desired in the final product. The proportions to be employed with any selected set of parameters can readily be ascertained by one having ordinary skill in the art of forehearth coloring techniques. It is possible, by manipulating the concentration of coloring agents in the glass component and by, manipulating the let-down ratio of the color forehearth frits, pearls or concentrates in the molten base glass, to produce a wide variety of desirable color glasses.

The following examples are intended only to illustrate the invention and should not be construed as imposing limitations upon the claims.

EXAMPLES

Examples of Frits A. B and C are shown in table 2.

Frit A: frit is smelted adding the different raw materials in a continuous, rotary or induction smelter at a temperature of about 1150° C. with an output of about 125 kg/h with an oxidant atmosphere.

Frit B: frit is smelted adding the different raw materials in a continuous, rotary or induction smelter at a temperature of about 1150° C. with an output of about 125 kg/h with an oxidant atmosphere.

Frit C: frit is smelted adding the different raw materials in a continuous, rotary or induction smelter at a temperature of about 1420° C. during a smelting time of about 170 minutes with a reducing atmosphere.

Pearl is manufactured adding raw materials, binder and water, pelletizing and drying as shown in FIG. 1. Raw materials are transferred from storage 10 to mills 20. Previously produced out of specification product 15 is added to the process flow between the storage 10 and mills 20. Ball milling of raw materials such as sodium silicate and is undertaken. The milled materials are weighed at weighing station 30. The weighed batch is dry mixed 40 and lifted 50 into a wet mixer 60. From the wet mixer 60, the intermediate product is fed 70 into a pelletizer 80. The pelletized product is then dried 90 then screened 100 before packing 110 into bags. The bagged/packaged product may be further stored 120 and repackaged 130 into boxes before final storage 140 as a final product.

In the examples of Table 2, below, in Frit System 2, Frits B and C are present in a weight ratio of 75% to 25%; in particular, 3% of Frit B and 1% of Frit C are introduced into the forehearth. In system 3, Frit B and the Pearl are present in a weight ratio of 87.5% to 12.5%; in particular, 3.5% of Frit B and 0.5% of the pearl are introduced into the forehearth. In general, other ratios of frits or frits to pearl are possible, such as 1:100 to 100:1, 1:50 to 50:1, 1:10 to 10:1, 1:5 to 5:1 and ranges of ratios with endpoints from different pairs in this sentence as well as valued in between.

TABLE 2

Frit Systems 1-3 including Examples of Frits A-C and a Pearl.

| Component | Ni + Cr Free frit 1 Example of Frit A | Ni + Cr Free system 2 Example of Frit B | Ni + Cr Free system 2 Example of Frit C | Ni + Cr Free system 3 Example of Frit B | Ni + Cr Free system 3 Example of Pearl |
|---|---|---|---|---|---|
| $SiO_2$ | 42.89 | 41.90 | 59.15 | 41.90 | 30.59 |
| $Na_2O$ | 23.00 | 23.00 | 9.34 | 23.00 | 37.25 |
| $B_2O_3$ | 4.00 | 4.00 | 1.41 | 4.00 | 3.36 |
| $Fe_2O_3$ | 20.00 | 20.00 | — | 20.00 | — |
| ZnO | 2.06 | 1.55 | 2.37 | 1.55 | — |
| CuO | 2.00 | 2.00 | — | 2.00 | — |
| CoO | 0.05 | 0.05 | — | 0.05 | — |
| Se | 2.00 | 1.50 | — | 1.50 | — |
| SnO | 4.00 | — | 12.11 | — | 27.54 |
| $Al_2O_3$ | 0.5 | 6.00 | 0.3 | 6.00 | — |
| $K_2O$ | — | — | 6.05 | — | — |
| BaO | — | — | 6.35 | — | — |
| CaO | — | — | 2.89 | — | 1.26 |
| MgO | — | — | 0.03 | — | — |

Additional advantages and modifications will readily occur to those skilled in the art. Therefore, the invention in its broader aspects is not limited to the specific details and illustrative example shown and described herein. Accordingly, various modifications may be made without departing from the spirit or scope of the general invention concept as defined by the appended claims and their equivalents.

The invention claimed is:

1. A color glass frit free of nickel and chromium, the frit comprising in weight %:
   from about 30 to about 50% $SiO_2$,
   from about 15 to about 30% $Na_2O$,
   from about 1 to about 10% $B_2O_3$,
   from about 10 to about 30% $Fe_2O_3$,
   from about 0.1 to about 5% ZnO,
   from about 0.1 to about 5% $Al_2O_3$,
   from about 0.1 to about 5% CuO,
   from about 0.01 to about 1% CoO,
   from about 0.1 to about 5% Se;
   from about 1 to about 8% $SnO/SnO_2$,
   no nickel and
   no chromium.

2. The color glass frit of claim 1 wherein the color glass frit is further devoid of at least one heavy metal other than nickel and chromium.

3. The color glass frit of claim 1 wherein the color glass frit is further devoid of all heavy metals.

4. A method for coloring a molten base glass in the forehearth of a glass furnace comprising the steps of:
   a. forming a frit that is free of nickel and chromium, the frit comprising in weight %:
      i. from about 30 to about 50% $SiO_2$,
      ii. from about 15 to about 30% $Na_2O$,
      iii. from about 1 to about 10% $B_2O_3$,
      iv. from about 10 to about 30% $Fe_2O_3$,
      v. from about 0.1 to about 5% ZnO,
      vi. from about 0.1 to about 5% Al2O3,
      vii. from about 0.1 to about 5% CuO,
      viii. from about 0.01 to about 1% CoO,
      ix. from about 0.1 to about 5% Se; and
      x. from about 1 to about 8% $SnO/SnO_2$.
   b. combining the frit with the molten glass contained in a forehearth so as to impart color to the molten glass; and
   c. cooling the molten glass to form a color glass composition.

5. A system of at least two color glass frits free of nickel and chromium, the first frit comprising in weight %:
   from about 30 to about 50% $SiO_2$,
   from about 15 to about 30% $Na_2O$, from about 1 to about 10% $B_2O_3$, and
from about 10 to about 30% $Fe_2O_3$,
from about 0.1 to about 5% ZnO,
from about 0.1 to about 10% $Al_2O_3$.
from about 0.1 to about 5% CuO,
from about 0.01 to about 1% CoO,
from about 0.1 to about 5% Se, and
the second frit comprising in weight %:
from about 30 to about 65% $SiO_2$,
from about 5 to about 15% $Na_2O$,
from about 1 to about 5% $B_2O_3$,
from about 1 to about 5% ZnO,
from about 5 to about 17% SnO or $SnO_2$,
from about 0.1 to about 3% $Al_2O_3$,
from about 3 to about 10% $K_2O$,
from about 3 to about 10% BaO,
from about 2 to about 6% CaO.

6. The color system of claim 5 wherein the first frit is devoid of at least one of SnO/$SnO_2$ $K_2O$, BaO, CaO and MgO.

7. The color glass frit of claim 5 wherein the color glass frit is further devoid of at least one heavy metal other than nickel and chromium.

8. The color glass frit of claim 5 wherein the color glass frit is further devoid of all heavy metals.

9. A method for coloring a molten base glass in the forehearth of a glass furnace comprising the steps of:
 a. forming a first frit that is free of nickel and chromium, the first frit comprising in weight %:
  i. from about 30 to about 50% $SiO_2$,
  ii. from about 15 to about 30% $Na_2O$,
  iii. from about 1 to about 10% $B_2O_3$,
  iv. from about 10 to about 30% $Fe_2O_3$,
  v. from about 0.1 to about 5% ZnO,
  vi. from about 0.1 to about 10% $Al_2O_3$.
  vii. from about 0.1 to about 5% CuO,
  viii. from about 0.01 to about 1% CoO, and
  ix. from about 0.1 to about 5% Se and
 b. forming a second frit that is free of nickel and chromium, the second frit comprising in weight %
  i. from about 30 to about 65% $SiO_2$,
  ii. from about 5 to about 15% $Na_2O$,
  iii. from about 1 to about 5% $B_2O_3$,
  iv. from about 1 to about 5% ZnO,
  v. from about 5 to about 17% SnO or SnO2,
  vi. from about 0.1 to about 3% $Al_2O_3$,
  vii. from about 3 to about 10% $K_{20}$,
  viii. from about 3 to about 10% BaO, and
  ix. from about 2 to about 6%) CaO,
 c. combining the first and second frits with the molten glass contained in a forehearth so as to impart color to the molten glass; and
 d. cooling the molten glass to form a color glass composition.

10. A color system including at least one frit that is free of nickel and chromium and at least one pearl that is free of nickel and chromium, the color glass frit comprising in weight %:
from about 30 to about 50% $SiO_2$,
from about 15 to about 30% $Na_2O$,
from about 1 to about 10% $B_2O_3$, and
from about 10 to about 30% $Fe_2O_3$,
from about 0.1 to about 5% ZnO,
from about 0.1 to about 10% $Al_1O_3$,
from about 0.1 to about 5% CuO,
from about 0.01 to about 1% CoO, and
from about 0.1 to about 5% Se, and
the pearl comprising a glass frit comprising in weight:
from about 15 to about 45% $SiO_2$,
from about 20 to about 50% $Na_2O$,
from about 0.5 to about 5% $B_2O_3$,
from about 15 to about 35% SnO or $SnO_2$, and
from about 0.1 to about 3% CaO.

11. The color glass system of claim 10 wherein the color glass frit is further devoid of at least one heavy metal other than nickel and chromium.

12. The color glass system of claim 10 wherein the color glass frit is further devoid of all heavy metals.

13. The color glass system of claim 10 wherein the color glass frit is devoid of at least one of SnO/$SnO_2$, $K_2O$, BaO, CaO and MgO.

14. The color glass system of claim 10 wherein the pearl is devoid of at least one of $Fe_2O_3$, ZnO, $Al_2O_3$, CoO, CuO, Se, $K_2O$, BaO and MgO.

15. A method for coloring a molten base glass in the forehearth of a glass furnace comprises the steps of:
 a. forming a first frit that is free of nickel and chromium, the first frit comprising in weight %:
  i. from about 30 to about 50% $SiO_2$,
  ii. from about 15 to about 30% $Na_2O$,
  iii. from about 1 to about 10% $B_2O_3$,
  iv. from about 10 to about 30% $Fe_2O_3$,
  v. from about 0.1 to about 5% ZnO,
  vi. from about 0.1 to about 10% $Al_2O_3$.
  vii. from about 0.1 to about 5% CuO,
  viii. from about 0.01 to about 1% CoO, and
  ix. from about 0.1 to about 5% Se and
 b. forming a pearl that is free of nickel and chromium and comprises in weight %:
  i. from about 15 to about 45% $SiO_2$,
  ii. from about 20 to about 50% $Na_2O$,
  iii. from about 0.5 to about 5% $B_2O_3$,
  iv. from about 15 to about 35% SnO or $SnO_2$, and
  v. from about 0.1 to about 3% CaO.
 c. combining the first frit and pearl with the molten glass contained in a forehearth so as to impart color to the molten glass; and
 d. cooling the molten glass to form a color glass composition.

\* \* \* \* \*